US007146066B2

(12) United States Patent
Katagiri et al.

(10) Patent No.: US 7,146,066 B2
(45) Date of Patent: Dec. 5, 2006

(54) WAVELENGTH DIVISION MULTIPLEXING OPTICAL TRANSMISSION SYSTEM

(75) Inventors: Toru Katagiri, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 10/995,179

(22) Filed: Nov. 24, 2004

(65) Prior Publication Data

US 2006/0039703 A1 Feb. 23, 2006

(30) Foreign Application Priority Data

Aug. 20, 2004 (JP) ............................ 2004-241029

(51) Int. Cl.
*G02B 6/14* (2006.01)
*G02B 6/28* (2006.01)

(52) U.S. Cl. .......................................... 385/14; 385/24

(58) Field of Classification Search .................. 385/24, 385/14

See application file for complete search history.

(56) References Cited

U.S. PATENT DOCUMENTS

| | | | | |
|---|---|---|---|---|
| 6,456,411 | B1 * | 9/2002 | Ishikawa et al. | 398/192 |
| 6,694,273 | B1 * | 2/2004 | Kurooka et al. | 702/69 |
| 6,925,262 | B1 * | 8/2005 | Ooi et al. | 398/147 |
| 2001/0048539 | A1 * | 12/2001 | Kubo et al. | 359/161 |
| 2002/0015207 | A1 * | 2/2002 | Ooi et al. | 359/161 |
| 2002/0123851 | A1 * | 9/2002 | Kurooka et al. | 702/69 |
| 2003/0026543 | A1 * | 2/2003 | Verdrager et al. | 385/37 |

FOREIGN PATENT DOCUMENTS

| | | | |
|---|---|---|---|
| JP | 9-116494 | | 5/1997 |
| JP | 2003-060677 | | 2/2003 |
| WO | WO 03/028403 | | 4/2003 |
| WO | WO 03/061164 | | 7/2003 |
| WO | WO03028403 | * | 4/2006 |

OTHER PUBLICATIONS

I. Mandelbaum et al., "Novel Technique for Group Velocity Dispersion Measurements in Optical Fibers", IEEE Photonics Technology Letters vol. 14, No. 3, Mar. 2002, pp. 349-351.

Supplemental Search Report for corresponding European Appln. No. 05000902.6 dated Apr. 19, 2006.

* cited by examiner

*Primary Examiner*—Kaveh Kianni
(74) *Attorney, Agent, or Firm*—Staas & Halsey LLP

(57) ABSTRACT

The objective of the present invention is to realize a chromatic dispersion compensation method which does not depend on a wavelength path in a photonic network to which a HUB node is applied and its monitoring control. In order to achieve this purpose, the present invention controls a plurality of variable chromatic dispersion compensators arbitrarily disposed in the photonic network based on the measured results of a plurality of chromatic dispersion monitors arbitrarily disposed in the photonic network and wavelength path information kept by the network management system which manages the entire photonic network. Here, the variable chromatic dispersion compensator within the network that should be controlled and the chromatic dispersion compensated quantity thereof are determined based on the measured results of the chromatic dispersion monitor and the wavelength path information kept by NMS.

11 Claims, 16 Drawing Sheets

NMS
HUB-I
HUB-II
HUB-III
HUB-IV
HUB-V
Tx-I
Tx-II
Tx-III
Tx-IV
Rx-I
Rx-II
MONITOR-A
MONITOR-B
Path group A ($\lambda_1$, $\lambda_{11}$)
Path group B ($\lambda_5$, $\lambda_7$, $\lambda_9$)
Path group C ($\lambda_6$, $\lambda_{10}$)
Path group D ($\lambda_2$, $\lambda_8$)
Path group E ($\lambda_4$, $\lambda_6$, $\lambda_8$)
Path group F ($\lambda_1$, $\lambda_3$, $\lambda_5$, $\lambda_{11}$)
Link i
Link ii
Link iii
Link iv
Link v
Link vi
Link vii
Link viii
Link ix
Link x
Link xi

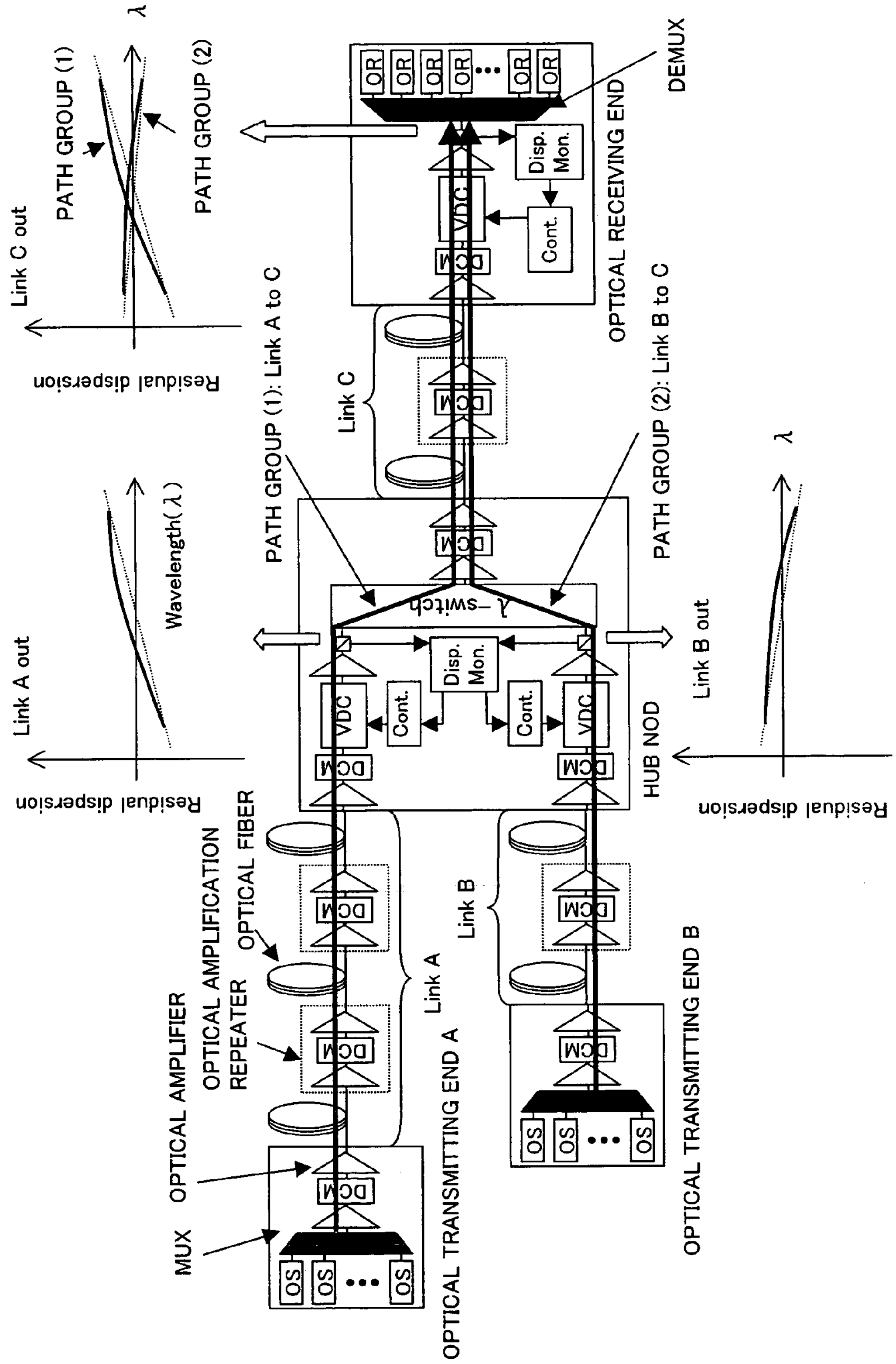
F I G. 1

| λ path group | Tx No. | Rx No. | Accommodated λ | PATH (Link) | | | | | | | | | | |
|---|---|---|---|---|---|---|---|---|---|---|---|---|---|---|
| | | | | i | ii | iii | iv | v | vi | vii | viii | ix | x | xi |
| A | Tx-I | Rx-I | $\lambda_1$, $\lambda_{11}$ | 1 | 2 | 3 | 4 | | | | | | | |
| B | Tx-II | Rx-I | $\lambda_5$, $\lambda_7$, $\lambda_9$ | | 2 | 3 | 4 | 1 | | | | | | |
| C | Tx-II | Rx-II | $\lambda_6$, $\lambda_{10}$ | | 2 | | | 1 | 3 | | | 4 | | 5 |
| D | Tx-III | Rx-II | $\lambda_2$, $\lambda_8$ | | | | | | | | 1 | 2 | | 3 |
| E | Tx-IV | Rx-I | $\lambda_4$, $\lambda_6$, $\lambda_8$ | | | | 3 | | | 2 | | | 1 | |
| F | Tx-IV | Rx-II | $\lambda_1$, $\lambda_3$, $\lambda_5$, $\lambda_{11}$ | | | | | | | | | | 1 | 2 |

F I G. 2B

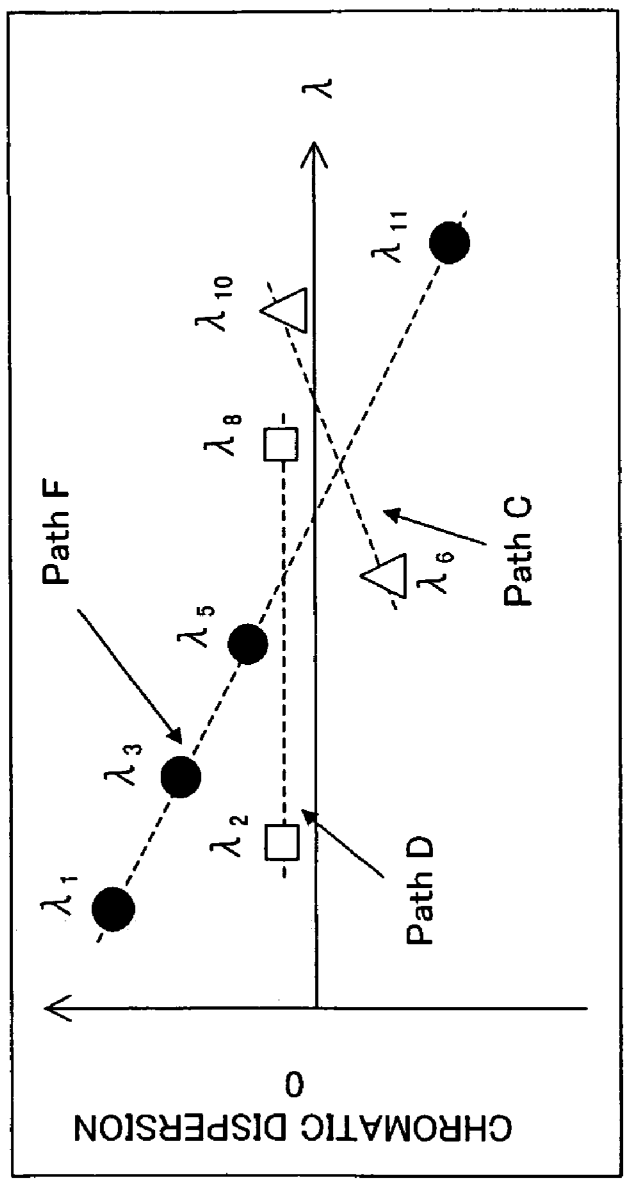
F I G. 4

| λ path group | Tx No. | Rx No. | Accommodated λ | PATH (Link) | | | | | | | | | | | D slope ($ps/nm^2$) |
|---|---|---|---|---|---|---|---|---|---|---|---|---|---|---|---|
| | | | | i | ii | iii | iv | v | vi | vii | viii | ix | x | xi | |
| A | Tx-I | Rx-I | $\lambda_1$, $\lambda_{11}$ | 1 | 2 | 3 | 4 | | | | | | | | 20 |
| B | Tx-II | Rx-I | $\lambda_5$, $\lambda_7$, $\lambda_9$ | | 2 | 3 | 4 | 1 | | | | | | | 20 |
| C | Tx-II | Rx-II | $\lambda_6$, $\lambda_{10}$ | | 2 | | | 1 | 3 | | | 4 | | 5 | 10 |
| D | Tx-III | Rx-II | $\lambda_2$, $\lambda_8$ | | | | | | | | 1 | 2 | | 3 | 0 |
| E | Tx-IV | Rx-I | $\lambda_4$, $\lambda_6$, $\lambda_8$ | | | | 3 | | | 2 | | | 1 | | -20 |
| F | Tx-IV | Rx-II | $\lambda_1$, $\lambda_3$, $\lambda_5$, $\lambda_{11}$ | | | | | | | | | | 1 | 2 | -30 |

F I G. 6

| λ path group | PATH (Link) | | | | | | | | | | | NUMBER OF PATHS THAT HAVE BEEN PASSED ($LC_i$) |
|---|---|---|---|---|---|---|---|---|---|---|---|---|
| | i | ii | iii | iv | v | vi | vii | viii | ix | x | xi | |
| A | $p_{11}$ | $p_{12}$ | $p_{13}$ | $p_{14}$ | $p_{15}$ | $p_{16}$ | $p_{17}$ | $p_{18}$ | $p_{19}$ | $p_{1\,10}$ | $p_{1\,11}$ | $LC_1 = \sum p_{1k}$ |
| B | $p_{21}$ | $p_{22}$ | $p_{23}$ | $p_{24}$ | $p_{25}$ | $p_{26}$ | $p_{27}$ | $p_{28}$ | $p_{29}$ | $p_{2\,10}$ | $p_{2\,11}$ | $LC_2 = \sum p_{2k}$ |
| C | $p_{31}$ | $p_{32}$ | $p_{33}$ | $p_{34}$ | $p_{35}$ | $p_{36}$ | $p_{37}$ | $p_{38}$ | $p_{39}$ | $p_{3\,10}$ | $p_{3\,11}$ | $LC_3 = \sum p_{3k}$ |
| D | $p_{41}$ | $p_{42}$ | $p_{43}$ | $p_{44}$ | $p_{45}$ | $p_{46}$ | $p_{47}$ | $p_{48}$ | $p_{49}$ | $p_{4\,10}$ | $p_{4\,11}$ | $LC_4 = \sum p_{4k}$ |
| E | $p_{51}$ | $p_{52}$ | $p_{53}$ | $p_{54}$ | $p_{55}$ | $p_{56}$ | $p_{57}$ | $p_{58}$ | $p_{59}$ | $p_{5\,10}$ | $p_{5\,11}$ | $LC_5 = \sum p_{5k}$ |
| F | $p_{61}$ | $p_{62}$ | $p_{63}$ | $p_{64}$ | $p_{65}$ | $p_{66}$ | $p_{67}$ | $p_{68}$ | $p_{69}$ | $p_{6\,10}$ | $p_{6\,11}$ | $LC_6 = \sum p_{6k}$ |
| NUMBER OF RECEIVED λ Path group | $PC_1$ | $PC_2$ | $PC_3$ | $PC_4$ | $PC_5$ | $PC_6$ | $PC_7$ | $PC_8$ | $PC_9$ | $PC_{10}$ | $PC_{11}$ | ----- |
| DEGREE OF INFLUENCE | $IC_1$ | $IC_2$ | $IC_3$ | $IC_4$ | $IC_5$ | $IC_6$ | $IC_7$ | $IC_8$ | $IC_9$ | $IC_{10}$ | $IC_{11}$ | ----- |

$$PC_k = p_{1k} + p_{2k} + \ldots + p_{6k} \quad (k=1, 2, 3, \ldots)$$

$$IC_k = p_{1k} \cdot LC_1 + p_{2k} \cdot LC_2 + \ldots + p_{6k} \cdot LC_6 \quad (k=1, 2, 3, \ldots)$$

F I G. 7

| λ path group | PATH (Link) | | | | | | | | | | | NUMBER OF PATHS THAT HAVE BEEN PASSED ($LC_m$) |
|---|---|---|---|---|---|---|---|---|---|---|---|---|
| | i | ii | iii | iv | v | vi | vii | viii | ix | x | xi | |
| A | 1 | 1 | 1 | 1 | 0 | 0 | 0 | 0 | 0 | 0 | 0 | 4 |
| B | 0 | 1 | 1 | 1 | 1 | 0 | 0 | 0 | 0 | 0 | 0 | 4 |
| C | 0 | 1 | 0 | 0 | 1 | 1 | 0 | 0 | 1 | 0 | 1 | 5 |
| D | 0 | 0 | 0 | 0 | 0 | 0 | 0 | 1 | 1 | 0 | 1 | 3 |
| E | 0 | 0 | 0 | 1 | 0 | 0 | 1 | 0 | 0 | 1 | 0 | 3 |
| F | 0 | 0 | 0 | 0 | 0 | 0 | 0 | 0 | 0 | 1 | 1 | 2 |
| NUMBER OF RECEIVED λ Path group | 1 | 3 | 2 | 3 | 2 | 1 | 1 | 1 | 2 | 2 | 3 | —— |
| DEGREE OF INFLUENCE | 4 | 13 | 8 | 11 | 9 | 5 | 3 | 3 | 8 | 5 | 10 | —— |

FIG. 8

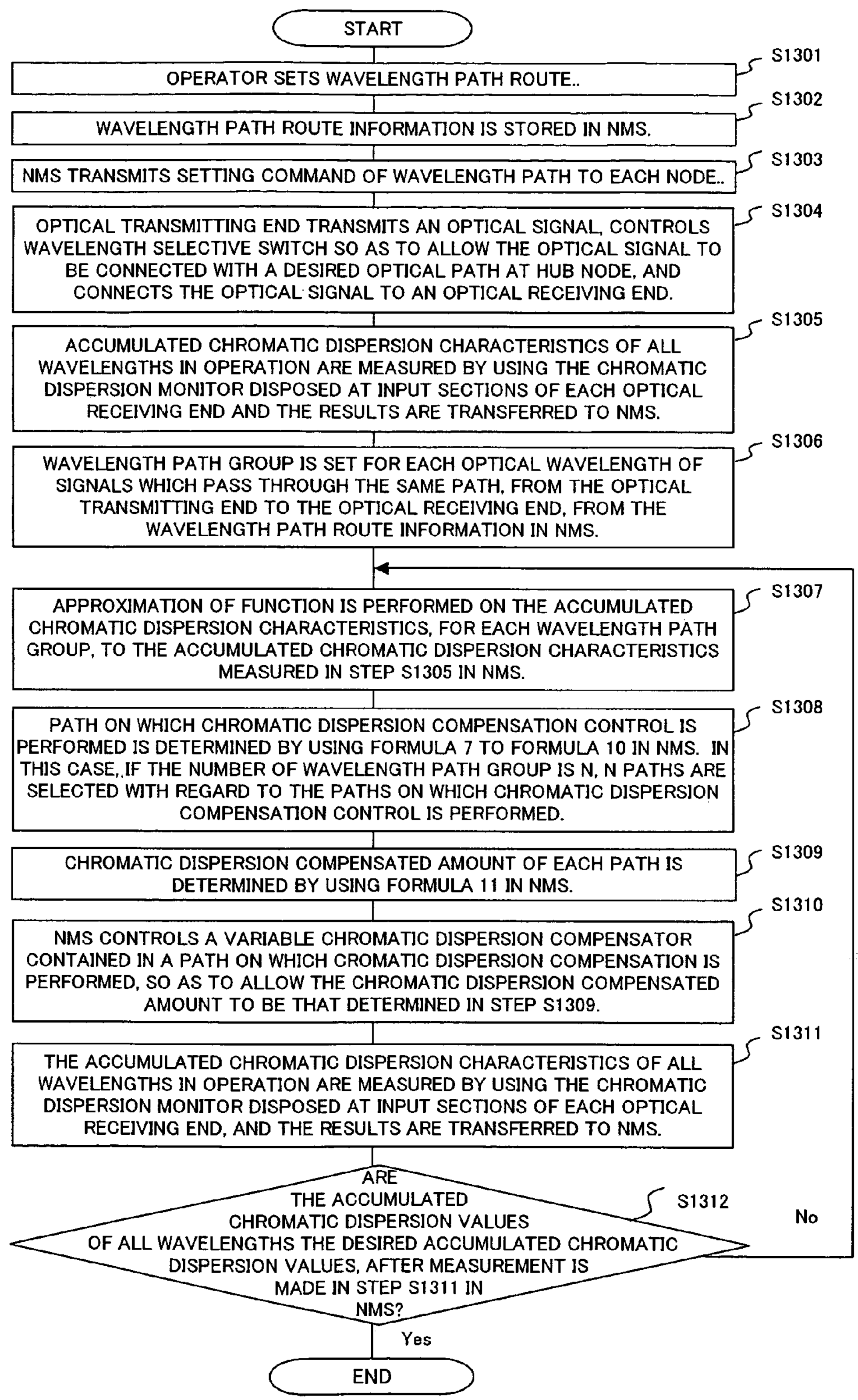
F I G. 1 3

WAVELENGTH DIVISION MULTIPLEXING OPTICAL TRANSMISSION SYSTEM

BACKGROUND OF THE INVENTION

1. Field of the Invention

The present invention relates to a wavelength division multiplexing optical transmission system wherein chromatic dispersion compensation and monitoring control thereof are executed in a photonic network having a node device which performs an optically branched insertion and an optical path shifting of an optical signal as is.

2. Description of the Related Art

Conventionally, construction of a photonic network having topology such as a ring and a mesh which utilize an OADM (Optical Add/Drop Multiplexing) node for performing the optically branched insertion of an optical signal as is, without performing photoelectric conversion, and a HUB node for performing the optical path shifting in wavelength unit (including drop and continue) is required. Realization of flexible and simple operation and maintenance is expected in a photonic network such as this.

The optical wavelength of each signal is regarded as the unit of a path in the photonic network to which a WDM (Wavelength Division Multiplexing) Optical Transmission Technology is applied. This path is called a wavelength path. In addition, the branched insertion or optical path shifting of an optical signal is performed by this wavelength path unit, in the photonic network to which the OADM node which performs the optically branched insertion of the optical signal as is, without performing photoelectric conversion, or the HUB node which performs the optical path shifting is applied.

Here, attention is focused particularly on the photonic network to which the HUB node, which performs the optical path shifting of the optical signal as is, is applied, in the specification according to the present invention.

FIG. 1 is a diagram showing an example of the photonic network to which the HUB node, which performs the optical path shifting in the optical signal as is, is applied.

The network shown in FIG. 1 comprises a transmitting end (the transmitting end A and the transmitting end B in the figure), an optical amplification repeater, a transmission line which comprises optical fibers (Link A, B and C in the figure), a HUB node, and a receiving end.

Each optical amplification repeater comprises single or multistage optical amplifiers and a dispersion compensation module (DCM in the figure), which is disposed between either before or after the single optical amplifier or between the stages of multistage optical amplifiers to compensate the accumulated chromatic dispersion of the optical fiber as a transmission line. Each transmitting end comprises optical transmitters of each wavelength (shown as OS in the Figure), an optical multiplexer (shown as MUX in the Figure), single or multistage optical amplifiers, and the dispersion compensation module which is disposed either before or after the single optical amplifier or between the stages of multistage optical amplifiers. The HUB node has a plurality of input ports and output ports and comprises single or multistage optical amplifiers which is disposed at each I/O port, the dispersion compensation module which is disposed either before or after the single optical amplifier or between the stages of multistage optical amplifiers, a wavelength selective switch (λ-switch in the figure) which switches optical paths according to each wavelength, a variable dispersion compensator (VDC in the figure), a control circuit of the variable dispersion compensator (Cont. in the figure) and a chromatic dispersion monitor (Disp. Mon. in the figure) The optical receiving end comprises single or multistage optical amplifiers, and the dispersion compensation module which is disposed either before or after the single optical amplifier or between the stages of multistage optical amplifiers, the variable dispersion compensator (VDC in the figure), the control circuit of the variable dispersion compensator (Cont. in the figure) and the chromatic dispersion monitor (Disp. Mon. in the figure). In addition, the variable dispersion compensator is capable of compensating the accumulated chromatic dispersion and the dispersion slope (primary wavelength dependent characteristics of accumulated chromatic dispersion).

In the optical transmitting end A and the optical receiving end B, optical signals output from optical transmitters of each wavelength are input to the transmission paths after they are wavelength multiplexed by optical multiplexers, optically amplified by optical amplifiers as optical signals, and chromatic dispersion compensated by the dispersion compensation module. A WDM signal output from the optical transmitting end A transmits Link A, and a WDM signal outputted from the optical transmitting end B transmits Link B. Each WDM signal is connected with the HUB node.

The WDM signal input to the HUB node from Link A and Link B are optically amplified by the optical amplifier as optical signals and are chromatic dispersion compensated by the dispersion compensation module. In addition, the accumulated chromatic dispersions of each WDM signal are measured individually by the chromatic dispersion monitor, which is connected with the output side of the optical amplification repeater via an optical coupler. The measured results are transferred to the control circuit of the variable chromatic dispersion compensator, to the rear stage of the dispersion compensation module which is disposed either before or after the single optical amplifier or between the stages of multistage optical amplifiers. This circuit controls the variable chromatic dispersion compensator for each WDM signals from Link A and Link B so as to allow the accumulated chromatic dispersion value to be that predetermined in system design, or so as to allow the received optical signal quality at the optical receiving end to be the highest in the control circuit.

As stated above, the WDM signals from Link A and Link B on which the accumulated chromatic dispersion compensation has been individually performed are input to the wavelength selective switch. The path shifting control is performed on the WDM signals as optical signals in the wavelength selective switch.

In the configuration example of the photonic network shown in FIG. 1, because the output port is only one port, both WDM signals from Link A and Link B are connected with Link C by the path shifting control in the wavelength selective switch. Both WDM signals from Link A and Link B are transmitted through Link C and are inputted to the optical receiving end. After the signals are optically amplified by the optical amplifier as optical signals and are chromatic dispersion compensated by the dispersion compensation module at the optical receiving end, the signals are branched into optical signals of each wavelength by the branching filter, and the signals are then received by the optical receiver by each wavelength. Here, a plurality of wavelength paths contained in the WDM signal which is connected with the optical receiving end via Link A, the HUB node, and Link C from the optical transmitting end A is called the wavelength path group (1), and a plurality of wavelength paths contained in the WDM signal which is connected with the optical receiving end via Link B, the HUB node, and Link C from the optical remitting end B is called the wavelength path group (2).

In the photonic network above, the accumulated chromatic dispersion compensation is performed independently for each Link, as stated earlier. Therefore, as shown in each of the accumulated chromatic dispersion vs. signal optical wavelength characteristics of Link A, B, C in FIG. 1, each Link may have different accumulated chromatic dispersion characteristics; in Link A, the wavelength dependency characteristics of the accumulated chromatic dispersion characteristics have a positive gradient to the wavelength axis, and in contrast, the wavelength dependency characteristics have a negative gradient to the wavelength axis in Link B. In addition, if the WDM signals of Link A and Link B which have differing accumulated chromatic dispersion characteristics are multiplexed in the HUB node and are input to Link C, the accumulated chromatic dispersion characteristics in the wavelength path group (1) and the wavelength path group (2) differ. As a result, the optimum accumulated chromatic dispersion compensation can not be performed on each wavelength path contained in both wavelength path group (1) and the wavelength path group (2) by using the dispersion compensation module contained in the single or multistage optical amplifiers in the Link C, and the dispersion compensation module and the variable dispersion compensator provided at the optical receiving end. Furthermore, due to the difference in the accumulated chromatic dispersion characteristics of each wavelength path, the distortions of transmitted waveforms differ with each wavelength path, and this waveform distortion significantly limits the transmission distance of the wavelength path.

In addition, in the WDM network connected in a mesh by a plurality of optical cross connects, a technology that relates to an optical network system which compensates the transmission characteristics deterioration attributable to the dispersion of the optical filter constituting the optical cross connect and its dispersion compensation control method thereof are disclosed (for example, see Reference 1).

Moreover, in the transoceanic wavelength division multiplexing (WDM) optical amplification transmission system which multiplexes and transmits a plurality of wavelengths, the references on the wavelength division multiplexing sea-bottom branching system that uses the WDM sea-bottom branching device which branches and inserts a certain wavelength are disclosed (for example, see Reference 2).

Reference 1: Japanese Patent Publication: Japanese Patent Laid-open Publication No. 2003-60577

Reference 2: Japanese Patent Publication: Japanese Patent Laid-open Publication No. 9-116494

As stated above, in the photonic network to which a conventional HUB node is applied, the accumulated chromatic dispersion compensation is performed independently for each Link between the optical receiving end and the HUB node, between the HUB nodes, and between the HUB node and the optical receiving end. Therefore, since the accumulated chromatic dispersion characteristics may differ with wavelength path, there arises a problem in that the transmission characteristics differ with wavelength path attributable thereto. This causes the transmission distance to differ with wavelength path and becomes a factor in the deterioration of system performance.

SUMMARY OF THE INVENTION

The object of the present invention is to realize a chromatic dispersion compensation system which does not depend on a wavelength path in a photonic network to which a HUB node is applied, and a wavelength division multiplexing optical transmission system which performs its monitoring control.

The present invention adopts the constitution described below to solve the afore-mentioned objective.

A plurality of variable chromatic dispersion compensators arbitrarily disposed in the photonic network is controlled based on the wavelength path information held by a network management system (NMS) which manages the entire photonic network and the measured results of a plurality of the chromatic dispersion monitors arbitrarily disposed in the photonic network. Based on the measured results of the chromatic dispersion monitor and the wavelength path information held by NMS, the variable chromatic dispersion compensators which should be controlled in the network are determined, as is its chromatic dispersion compensated quantity, thereby enabling the provision of a photonic network which has a transmission path on which the chromatic dispersion compensation is performed and which does not depend on the wavelength path.

In other words, according to one embodiment of the present invention, the wavelength division multiplexing optical transmission system according to the present invention is a network management system wherein the optical transmitting end device, the optical amplification repeater, the optical switching device (for example, comprising the OADM and the HUB node) which performs optical branching insertion or the optical path shifting as optical signals, and the optical receiving end device are connected with optical fibers, and the optical transmitting end device, the optical amplification repeater, the optical switching device, and the optical receiving end device are integrally managed. The optical receiving end device is provided with the chromatic dispersion monitor at its input stage. The optical receiving end device, the optical switching device, or at least one optical amplification repeater which is disposed between the optical transmitting end device and the optical switching device, between the optical switching device and other optical switching device, the optical switching device and the optical receiving end device, or the optical transmitting end device and the optical receiving end device, is provided with the variable chromatic dispersion compensator. The network management system is characterized by having the optical amplification repeater, a unit which calculates the chromatic dispersion compensated quantity and the position of the variable chromatic dispersion compensator with which the optical switching device or the optical receiving end device is provided, and the chromatic dispersion compensated quantity controller which sets the chromatic dispersion corresponding to the chromatic dispersion compensated quantity calculated above to the variable chromatic dispersion compensator are provided, based on memory which stores network configuration information comprising the layout information of each device constituting the wavelength division multiplexing optical transmission system, the connection information, the measured results of the accumulated chromatic dispersion of each signal optical wavelength by the chromatic dispersion monitor, and the path information of the signal optical wavelength.

Moreover, the network management system according to the present invention determines a plurality of signal optical wavelengths of one wavelength or more which passes through the same path from the optical transmitting end device to the optical receiving end device to be one signal optical wavelength group, and creates a matrix wherein the row indicates a signal optical wavelength group i and the column indicates a path j, using the path information of the signal optical wavelength held by the network management system. The factor of the matrix, $p_{ij}$, is determined to be $p_{ij}=1$ if the signal optical wavelength group i passes through a certain path j, and is determined to be $p_{ij}=0$ if the signal optical wavelength group i does not pass through a certain path j. In this matrix, the number of paths ($LC_i$) through which each signal optical wavelength group i passes is determined by:

$$LC_i = \sum_j p_{ij}$$

The number of the signal optical wavelength groups ($PC_j$) which are placed in each path j is determined by:

$$PC_j = \sum_i p_{ij}$$

The dot product ($IC_j$) of the column $p_{ij}$ (j being a constant) and the $LC_i$ in the matrix is determined by:

$$IC_j = \sum_i p_{ij} \cdot LC_i$$

It is preferable to perform the chromatic dispersion compensation control using a path where both $PC_j$ and $IC_j$ are small.

In addition, the network management system according to the present invention determines a plurality of signal optical wavelengths of one wavelength or more which passes through the same path from the optical transmitting end device to the optical receiving end device to be one signal optical wavelength group, and creates a matrix wherein the row indicates the signal optical wavelength group i and the column indicates a path j using the path information of the signal wavelength held by the network management system. The factor of the matrix, $p_{ij}$, is determined to be $p_{ij}=1$ if the signal optical wavelength group i pass through a certain path j, or $p_{ij}=0$ if the signal optical wavelength group pass through a certain path j. In this matrix, the number of the paths ($LC_i$) through which each signal optical wavelength group "i" passes is determined by:

$$LC_i = \sum_j p_{ij}$$

The number of the signal optical wavelength groups ($PC_j$) which are placed in each path j is determined by:

$$PC_j = \sum_i p_{ij}$$

The dot product ($IC_j$) of the column $p_{ij}$ (j being a constant) and the $LC_i$ in the matrix is determined by:

$$IC_j = \sum_i p_{ij} \cdot LC_i$$

It is preferable to perform the chromatic dispersion compensation control using a path where both $PC_j$ and $IC_j$ are large In addition, it is preferable that the network management system according to the present invention determines a plurality of signal optical wavelengths of one wavelength or more which passes through the same path from the optical transmitting end device to the optical receiving end device to be one signal optical wavelength group, has a function for storing the measured results of the accumulated chromatic dispersion of each signal optical wavelength by the chromatic dispersion monitor to the network management system, performs approximation of function by using a n-degree polynomial expression, a 3-degree Sellmeier's polynomial expression, or a 5-degree Sellmeier's polynomial expression for each measured result of the accumulated chromatic dispersion of the signal optical wavelength which belongs to the signal optical wavelength group, calculates the accumulated chromatic dispersion value in an arbitrary wavelength λ using the approximating equation, calculates the chromatic dispersion slope value in the arbitrary wavelength λ using the equation where a primary differential is performed on the approximating equation, determines the chromatic dispersion compensated quantity from the difference between the accumulated chromatic dispersion value and a desired accumulated chromatic dispersion value, determines the chromatic dispersion slope compensated quantity from the difference between the chromatic dispersion slope value and a desired chromatic dispersion slope value, and sets the dispersion value of the variable chromatic dispersion compensator with which the optical amplification repeater, the optical switching device or the optical receiving end device is provided, and provides the chromatic dispersion compensated quantity controller which performs chromatic dispersion compensation so as to obtain the chromatic dispersion compensated quantity and the chromatic dispersion slop compensated quantity.

In addition, it is preferable that the network management system according to the present invention determines a plurality of signal optical wavelengths of one wavelength or more which passes through the same path from the optical transmitting end device to the optical receiving end device to be one signal optical wavelength group, selects the upper-level N path based on the result of the order of paths on which the chromatic dispersion compensation control is performed from claim 2 or claim 3 when there are N groups on the signal optical wavelength group, and when the dispersion slope quantity of the wavelength i is determined to be $DS_i$, the dispersion slope compensated quantity to the selected path j is determined to be DSC $_j$ in each path by determining the N-degree simple simultaneous equation which is:

$$\begin{bmatrix} p_{11} & p_{12} & \cdots & p_{1j} & \cdots & p_{1N} \\ p_{21} & p_{22} & \cdots & p_{2j} & \cdots & p_{2N} \\ \vdots & \vdots & & \vdots & & \vdots \\ p_{iI} & p_{i2} & \cdots & p_{ij} & \cdots & p_{iN} \\ \vdots & \vdots & & \vdots & & \vdots \\ p_{NI} & p_{N2} & \cdots & p_{Nj} & \cdots & p_{NN} \end{bmatrix} \cdot \begin{bmatrix} DSC_1 \\ DSC_2 \\ \vdots \\ DSC_j \\ \vdots \\ DSC_N \end{bmatrix} = - \begin{bmatrix} DS_1 \\ DS_2 \\ \vdots \\ DS_3 \\ \vdots \\ DS_4 \end{bmatrix}$$

In the foregoing, the accumulated chromatic dispersion of each wavelength path is found based on the measured result by the chromatic dispersion monitor disposed at the optical receiving end device. However, there is also the wavelength division multiplexing transmission system provided with the chromatic dispersion compensated quantity controller, wherein the accumulated chromatic dispersion value of each optical wavelength is found from the measured result of the chromatic dispersion measured when the optical fiber was laid or when the device was installed and the path information of the signal optical wavelength stored by the network management system, the result of accumulated chromatic dispersion is stored to the network management system, approximation of function is performed by using a n-degree polynomial expression, a 3-degree Sellmeier's polynomial expression, or a 5-degree Sellmeier's polynomial expression for each measured result of the accumulated chromatic dispersion of the signal optical wavelength which belongs to the signal optical wavelength group, the accumulated chromatic dispersion value in an arbitrary wavelength λ is calculated by the approximating equation, the chromatic dispersion slope value in the arbitrary wavelength λ is calculated by the equation where primary differential is performed on the approximating equation with regard to the wavelength, the chromatic dispersion compensated quantity is found from the difference between the accumulated chromatic dispersion value and a desired accumulated chromatic dispersion value, the chromatic dispersion slope compensated quantity is found from the difference between the chromatic dispersion slope value and a desired chromatic dispersion slope value, the dispersion value of the variable chromatic dispersion compensator with which the optical amplification repeater, the optical switching device, or the optical receiving end device is provided is set so as to obtain the chromatic dispersion compensated quantity and the chromatic dispersion slope compensated quantity.

BRIEF DESCRIPTION OF THE DRAWINGS

FIG. 1 is a schematic diagram showing the photonic network where the HUB node, which performs the path shifting of an optical signal as is, is applied;

FIG. 2B is a table showing one example of the wavelength path route information;

FIG. 4 is a diagram showing each of the measured results of the accumulated chromatic dispersion characteristics in the monitor B;

FIG. 6 is a diagram showing an example where the result of the chromatic dispersion slope value found is stored together with the wavelength path route management information in NMS;

FIG. 7 is a diagram showing an example of the matrix;

FIG. 8 is a diagram showing an example of the application of an examination of the degree of influence each path has on the wavelength path group to the wavelength path route information of the photonic network model;

FIG. 13 is a flowchart showing the flow of the entire processing;

DESCRIPTION OF THE PREFERRED EMBODIMENTS

Hereinafter, described are the chromatic dispersion compensation units to which the present invention is applied and the embodiments of the monitoring control units thereof.

Figure 2A:
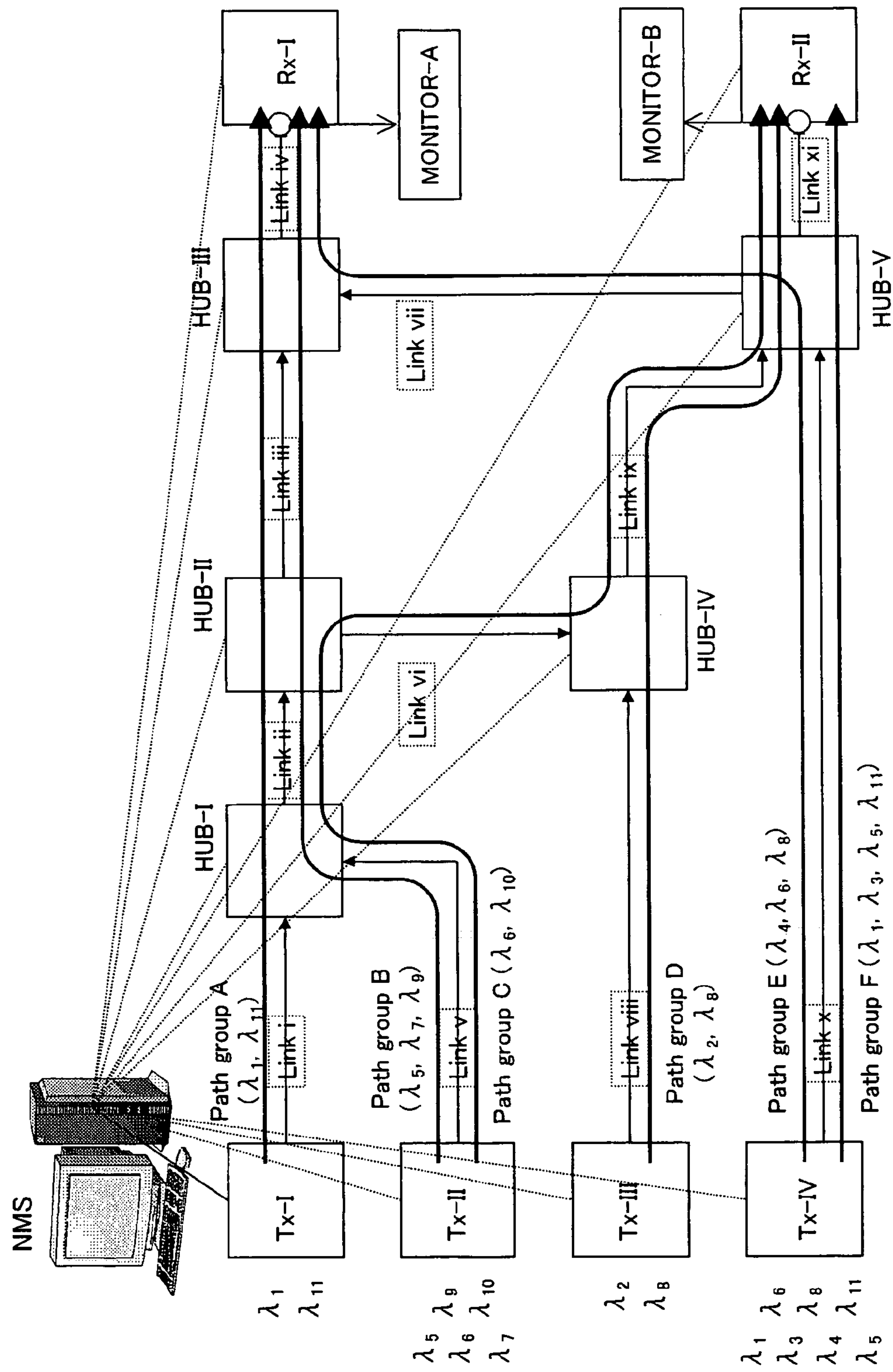
FIG. 2A is a schematic diagram showing one embodiment of the photonic network to which the present invention is applied.

FIG. 2A is a diagram showing one example of the photonic network to which the present invention is applied.

The photonic network shown in FIG. 2A comprises the optical transmitting end (Tx-I to Tx-IV in the figure), the HUB node (HUB-I to HUB-V in the figure), the optical receiving end (Rx-I, Rx-II in the figure), the transmission paths (Link, Link i to Link xi in the figure), and the network management system (NMS in the figure) which is connected with each optical transmitting end, the HUB node, the optical receiving end and manages the entire network.

In addition, each transmission path (Link) comprises the cascade connection of the optical amplification repeaters and the optical fibers. The optical amplification repeater is configured to be connected to single or multistage optical amplifiers and the dispersion compensation module for compensating the accumulated chromatic dispersion of the optical fibers used as the transmission paths, which is disposed either before or after the single optical amplifier or between the stages of multistage optical amplifiers. The optical transmitting end, the HUB node, and the optical receiving end are also provided single or multistage optical amplifiers and the dispersion compensation module for compensating the accumulated chromatic dispersion of the optical fibers used as the transmission paths, which is disposed either before or after the single optical amplifier or between the stages of multistage optical amplifiers.

In the photonic network: (1) the optical transmitting end and the HUB node are connected through an arbitrary transmission path (Link); (2) adjacent HUB nodes are connected together through the arbitrary transmission path (Link); (3) the HUB node and the optical receiving end are connected through the arbitrary transmission path (Link); or (4) the optical transmitting end and the optical receiving end are connected through the arbitrary transmission path (Link). In any of (1) to (4), at least one node device out of the optical transmitting end, the HUB node, the optical receiving end and the optical amplification repeater shall be provided with the variable dispersion compensator (VDC) and the control circuit for the variable dispersion compensator.

The variable dispersion compensator shall be disposed together with the dispersion compensation module between the stages of the manually connected optical amplifiers in each node device. In addition, the variable dispersion compensator shall be capable of compensating the accumulated chromatic dispersion and the dispersion slope (the primary wavelength dependency characteristics of the accumulated chromatic dispersion). Furthermore, the chromatic dispersion monitors (Monitor A, Monitor B in the Figure) shall be provided to the input section of the optical receiving end.

The WDM optical signal including a plurality of wavelength paths output from a plurality of the optical transmitting ends Tx-I to Tx-IV are received at each optical receiving end through a plurality of the transmission paths and a plurality of the HUB nodes. In the network management system, each wavelength path output from each optical transmitting end shall have the path information of the wavelength paths showing at which optical receiving ends the wavelength paths are received by, through which Links and which HUB nodes.

FIG. 2B is a table showing one example of the wavelength path route information.

"λ path group" in the Table shows the wavelength path groups where a plurality of wavelength paths passing though the same path are compiled into one group; "Tx No." shows from which optical transmitting end the wavelength path group is transmitted; "Rx No." shows at which optical receiving ends which wavelength path groups are received; "Accommodated λ" shows the wavelengths (Paths) contained in the wavelength path groups; "Path (Link)" shows the transmission paths (Link) through which the wavelength path groups pass; and the values in the Table show the order that the wavelength path groups pass through the transmission paths.

Here, the input sections of each optical receiving end in FIG. 2A are provided with the chromatic dispersion monitors (Monitor A, Monitor B in the Figure) and measures the accumulated chromatic dispersion characteristics by each wavelength. The measured results are shown in FIGS. 3 and 4.

Figure 3:
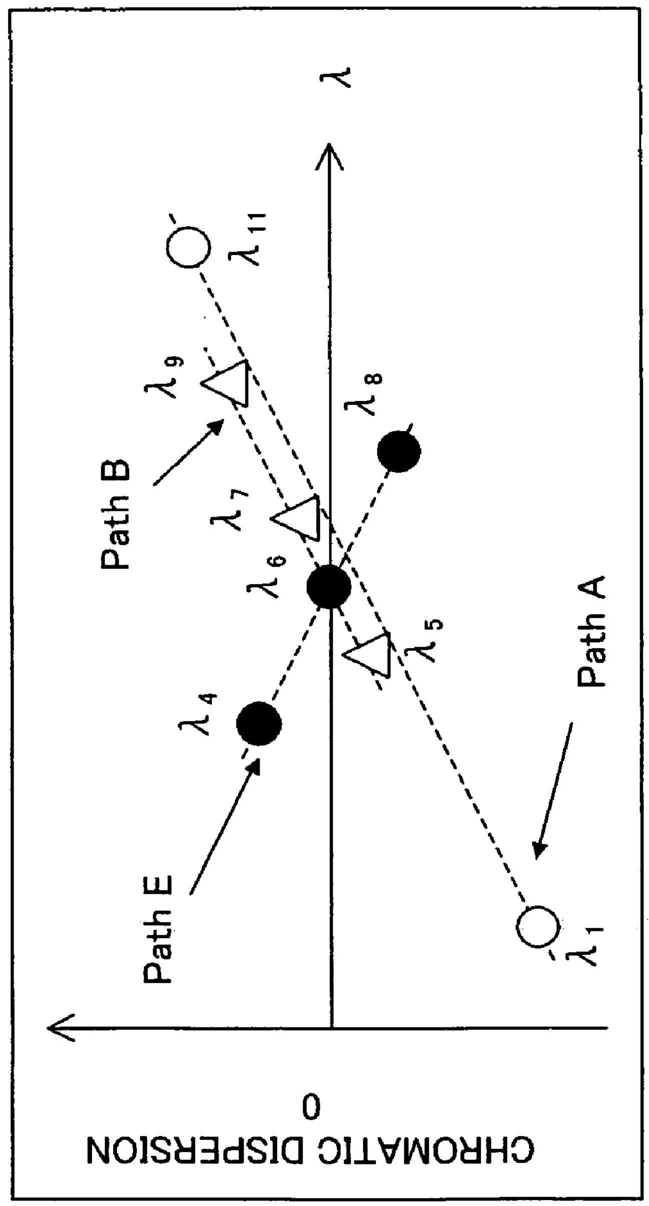
FIG. 3 is a diagram showing each of the measured results of the accumulated chromatic dispersion characteristics in the monitor A.

FIG. 3 is a diagram showing each of the measured results of the accumulated chromatic dispersion characteristics in the monitor A; and FIG. 4 is a diagram showing each of the measured results of the accumulated chromatic dispersion characteristics in the monitor B.

The vertical axes of FIGS. 3 and 4 shows the accumulated chromatic dispersion characteristics and the horizontal axes thereof show the wavelengths.

"○" in FIG. 3 shows the measured results of each wavelength path which belongs to the wavelength path group A in FIG. 2B, and "Δ" shows the measured results of each wavelength path which belongs to the wavelength path group B in FIG. 2B, and "●" shows the measured results of each wavelength path which belongs to the wavelength path group E in FIG. 2B. In addition, "Δ" in FIG. 4 shows the measured results of each wavelength path which belongs to the wavelength path group C in FIG. 2B, "□" shows the measured results of each wavelength path which belongs to the wavelength path group D in FIG. 2B, and "●" shows the measured results of each wavelength path which falls under the wavelength path group F in FIG. 2B.

Since paths through which each wavelength path passes differ and the accumulated chromatic dispersion characteristics by each Link differ as well, the measured accumulated chromatic dispersion characteristics are measured separately for each wavelength, as shown in FIGS. 3 and 4. Here, these chromatic dispersion measured results and the wavelength path route information kept by NMS are collated, and approximation of function is performed on the accumulated chromatic dispersion characteristics (RD) for each wavelength path group by using an n-degree polynomial expression:

$$RD(\lambda)=a_0+a_1\lambda+a_2\lambda^2+a_3\lambda^3+a_4\lambda^4+\ldots a_n\lambda^n \quad \text{Equation 1}$$

or by using a 3-degree Sellmeier's polynomial expression:

$$RD(\lambda)=a\lambda^2+b+c\lambda^{-n} \quad \text{Equation 2}$$

or by using a 5-degree Sellmeier's polynomial expression:

$$RD(\lambda)=a\lambda^4+b\lambda^2+c+d\lambda^{-2}+e\lambda^{-4} \quad \text{Equation 3}$$

In the recommendations (ITU-T) of International Telecommunication Union, it is recommended that, as an equation which performs approximation of function on the chromatic dispersion of an optical fiber, one should use the 3-degree Sellmeier's polynomial expression for a single mode fiber (SMF) where a zero dispersion wavelength is present in a 1.3 μm band or a 2-degree polynomial expression (a n-degree polynomial expression where n=2) for a dispersion shifted fiber (DSF) where a zero dispersion wavelength is present in a 1.55 μm band. In addition, if the measured result of the accumulated chromatic dispersion is present for four wavelengths or more, a more accurate approximation of function than those of the 2-degree polynomial expression or the 3-degree Sellmeier's polynomial expression recommended by ITU-T may be obtained by using the 5-degree Sellmeier's polynomial expression.

Figure 5:
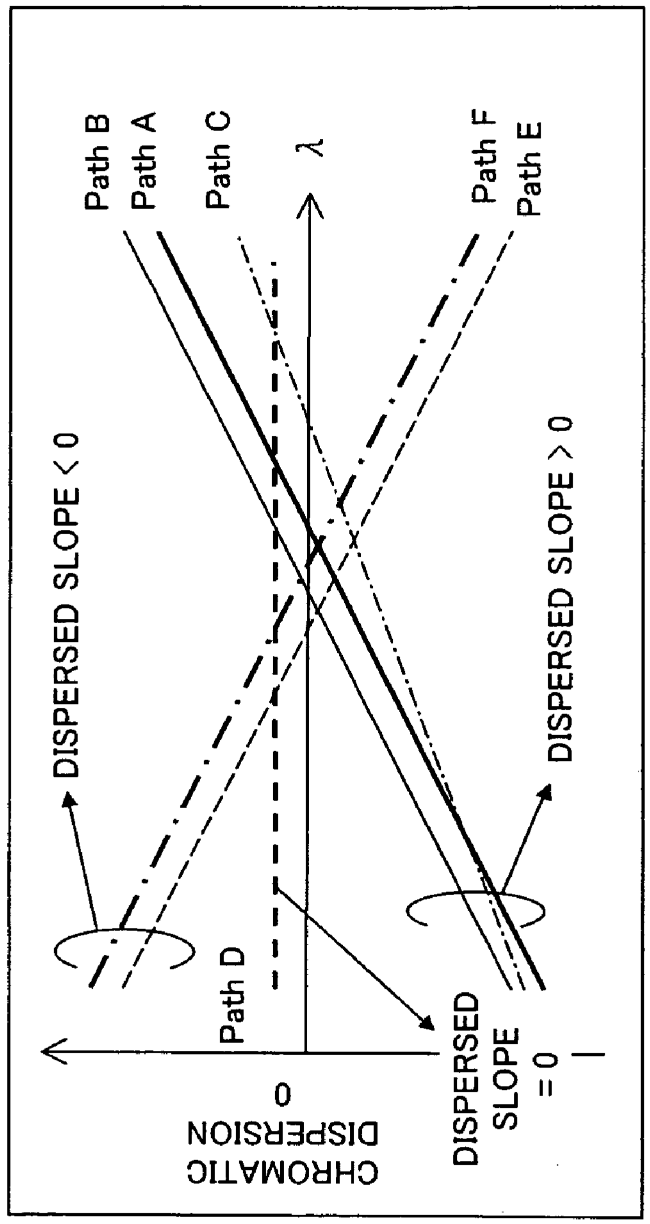
FIG. 5 is a diagram summarizing the accumulated chromatic dispersion characteristics by each wavelength path group on which approximation of function is performed.

The results of this approximation of function performed on the measured result of the accumulated chromatic dispersion for each wavelength path group are shown by the dotted lines in FIGS. 3 and 4. In addition, the summarization of the accumulated chromatic dispersion characteristics for each wavelength path group on which approximation of function has been performed is shown in FIG. 5. The examples in FIGS. 3, 4 and 5 show the results of the approximation of function up to the primary equation for simplification.

As can be seen from the foregoing, the chromatic dispersion slope value of the wavelength $\lambda_0$ ($\lambda_0$ being the central wavelength of the transmission band in the system, in this case) by performing a primary differential on λ to the accumulated chromatic dispersion characteristics RD (λ) which was determined by approximation of function using Equations 1, 2 and 3 on each wavelength path group, and the result is stored together with the wavelength path route management information in NMS. One example is shown in FIG. 6. Here, the chromatic dispersion slope of Equation 1 is expressed by the following equation:

$$\left.\frac{dRD(\lambda)}{d\lambda}\right|_{\lambda=\lambda_c}=a_1+2a_2\lambda_c+3a_3\lambda_c^2+4a_4\lambda_c^3+\ldots+na_n\lambda_c^{n-1} \quad \text{Equation 4}$$

The chromatic dispersion slope to Equation 2 is expressed by the following equation:

$$\left.\frac{dRD(\lambda)}{d\lambda}\right|_{\lambda=\lambda_c} = 2a\lambda_c + (-2)c\lambda_c^{-3} \quad \text{Equation 5}$$

The chromatic dispersion slope to Equation 3 is expressed by the following equation:

$$\left.\frac{dRD(\lambda)}{d\lambda}\right|_{\lambda=\lambda_c} = 4a\lambda_c^3 + 2b\lambda + (-2)d\lambda_c^{-3} + (-4)e\lambda_c^{-5} \quad \text{Equation 6}$$

Next, the concrete example of the dispersion compensation method is shown. A path on which the dispersion compensation control is performed is determined by using the variable chromatic dispersion compensator from the wavelength path route information and the dispersion slope information shown in FIG. 6, and the dispersion compensated quantity of the variable chromatic dispersion compensator provided in the path is determined.

Here, for the path on which the dispersion compensation control is performed, if the dispersion compensation control is performed by using the variable chromatic dispersion compensator provided in a certain path, the chromatic dispersion compensation control is determined to be a dispersion compensation for the fewest possible wavelength path groups. In order to determine the wave length compensation control, a Table for analyzing how many wavelength path groups are influenced by the variable chromatic dispersion compensator provided at a certain path is prepared from the information contained in FIG. 6. The matrix table is shown in FIG. 7.

In FIG. 7, the horizontal axis shows the path number (the path (Link) in the figure) and the number of paths (the number of paths (LCm) through which the groups pass in the figure) through which a certain wavelength path group passes, the vertical axis shows the wavelength path groups (λ path group in the Figure), the number of wavelength path groups which are placed in each path (the number of received λ path groups in the figure) and the degree of influence the qualities of each path (for example, the accumulated chromatic dispersion characteristics or the like) have on the wavelength path groups (the degree of the path in the figure). Here, the symbols p1k, p2k, . . . , p6k in FIG. 7 are equivalent to the wavelength path groups A (=p1), B (=p2), . . . , F (=p6), respectively, and the subscript k (=1, 2, 3, . . . ) are equivalent to the path (Link) number i, ii, iii, . . . , respectively.

An instance where a certain wavelength passes though the path "k" and an instance where it does not pass through the "k" are expressed by the following equation 7:

$P_{ik}$=0 or 1

0 . . . path through which the wavelength path group $p_j$ does not pass

1 . . . path through which the wavelength path group $p_j$ passes (i=1, 2, 3, . . . ,k=1, 2, 3, . . .) Equation 7 wherein, p1k, p2k, - - - indicate each wavelength path group, and the subscript k indicates the path number.

The number of paths (LCm) through which each wavelength path group passes is expressed by the following equation 8:

$$LC_i = \sum_k p_{ik} \quad \text{Equation 8}$$

($k$: integer, $p_i$: wavelength path group)

wherein, pik shows that a certain wavelength path group "pi" per Equation 7 passes through a path "k" (pik=1) or it does not pass through the path (pik=0) The number of wavelength path groups (PCk) which are accommodated by each rule is expressed by the following equation 9:

$$PC_k = p_{1k} + p_{2k} + p_{3k} + L(k=1,2,3,\ldots) \quad \text{Equation 9}$$

The degree of influence that each path has on the wavelength path group (the degree of influence of the path: ICk) is expressed by the following equation 10:

$$IC_k = p_{1k} \cdot LC_1 + p_{2k} \cdot LC_2 + L(k=1,2,3,K) \quad \text{Equation 10}$$

wherein, the larger ICk is, the more influence the transmission characteristics in the path have on the transmission quality of a plurality of wavelength path groups.

An example of the application of the examination of the degree of influence each path has on wavelength path groups based on the ideas in Equations 7 to 10, shown above, to the wavelength path route information (see FIG. 6) of the photonic network model shown in FIG. 2A is shown in FIG. 8.

The order of paths on which the chromatic dispersion compensation control is performed is determined by using the FIG. 8. The chromatic dispersion compensation control of an arbitrary path is performed by controlling the variable dispersion compensator from a position wherein the dispersion compensation is performed on the fewest possible wavelength path groups.

When considering FIG. 8, the chromatic dispersion compensation control is performed from a path where the number of the accommodated λ path groups (PCk) is small and a path where the degree of influence by the path (ICk) is small. In FIG. 8, the variable chromatic dispersion compensators disposed in each path are controlled in the order of the paths vii, viii, i, vi, x, iii, ix, v, xi, iv and ii.

Next, the chromatic dispersion control quantities of the variable chromatic dispersion compensators disposed in each path are determined.

If there are N numbers of wavelength path groups, the chromatic dispersion slope compensated quantity of the N paths can be found by first taking the N paths out to determine N-degree primary simultaneous equations from the information on the chromatic dispersion slope of the N group and the paths in which the order of the chromatic dispersion compensation control to be performed is determined. If the chromatic dispersion slope quantity of the N group is determined to be DSm (m being the name of the wavelength path group, the N group as a whole), and the dispersion slope compensated quantity of the path k is DSCk (k=1, 2, - - - , N), the following simultaneous equations are established:

$$\begin{bmatrix} p_{11} & p_{12} & \cdots & p_{1N} \\ p_{21} & p_{22} & \cdots & p_{2N} \\ \vdots & \vdots & & \vdots \\ p_{N1} & p_{N2} & \cdots & p_{NN} \end{bmatrix} \cdot \begin{bmatrix} DSC_1 \\ DSC_2 \\ \vdots \\ DSC_N \end{bmatrix} = - \begin{bmatrix} DS_1 \\ DS_2 \\ \vdots \\ DS_N \end{bmatrix} \quad \text{Equation 11}$$

wherein, pik=[0, 1]; pik is "1" if the wavelength path group pi passes through path k and pik is "0" if it does not pass through path k.

Next, this is described in detail by using an example of the photonic network shown in FIG. 2.

In the example of the photonic network shown in FIG. 2, there are a total of six wavelength path groups, and there is also chromatic dispersion slope information for each of the six wavelength path groups. Therefore, N=6. The control quantities of the variable chromatic dispersion compensators in each path are determined by establishing 6-degree primary simultaneous equations based on the results in FIG. 8 and the information regarding the chromatic dispersion slope. Here, the first six paths are selected from the information that determined the order of the chromatic dispersion compensation control to be performed is determined. Here, the order of the paths is vii, viii, I, vi, x and iii. If the simultaneous equations are established from the foregoing, they are from Equations 12 to 14 as follows:

$$\begin{bmatrix} p_{11} & p_{13} & p_{16} & p_{17} & p_{18} & p_{110} \\ p_{21} & p_{23} & p_{26} & p_{27} & p_{28} & p_{210} \\ p_{31} & p_{33} & p_{36} & p_{37} & p_{38} & p_{310} \\ p_{41} & p_{43} & p_{46} & p_{47} & p_{48} & p_{410} \\ p_{51} & p_{53} & p_{56} & p_{57} & p_{58} & p_{510} \\ p_{61} & p_{63} & p_{66} & p_{67} & p_{68} & p_{610} \end{bmatrix} \cdot \begin{bmatrix} DSC_1 \\ DSC_3 \\ DSC_6 \\ DSC_7 \\ DSC_8 \\ DSC_{10} \end{bmatrix} = - \begin{bmatrix} DS_1 \\ DS_2 \\ DS_3 \\ DS_4 \\ DS_5 \\ DS_6 \end{bmatrix} \quad \text{Equation 12}$$

$$\Leftrightarrow \begin{bmatrix} 1 & 1 & 0 & 0 & 0 & 0 \\ 0 & 1 & 0 & 0 & 0 & 0 \\ 0 & 0 & 1 & 0 & 0 & 0 \\ 0 & 0 & 0 & 0 & 1 & 0 \\ 0 & 0 & 0 & 1 & 0 & 1 \\ 0 & 0 & 0 & 0 & 0 & 1 \end{bmatrix} \cdot \begin{bmatrix} DSC_1 \\ DSC_3 \\ DSC_6 \\ DSC_7 \\ DSC_8 \\ DSC_{10} \end{bmatrix} = \begin{bmatrix} -20 \\ -20 \\ -10 \\ 0 \\ 20 \\ 30 \end{bmatrix} \quad \text{Equation 13}$$

$$\therefore \begin{bmatrix} DSC_1 \\ DSC_3 \\ DSC_6 \\ DSC_7 \\ DSC_8 \\ DSC_{10} \end{bmatrix} = \begin{bmatrix} 0 \\ -20 \\ -10 \\ -10 \\ 0 \\ 30 \end{bmatrix} \quad \text{Equation 14}$$

The dispersion slope compensation can be realized by each setting the dispersion slopes of the variable chromatic dispersion compensator provided in the paths i, iii, vi, vii, viii and x at 0, −20, −10, −10, 0, +30 ps/nm/nm from the results above.

The dispersion slopes are compensated from 20 ps/nm/nm to 0 ps/nm/nm by setting the variable dispersion slope compensator in the path iii to the dispersion slope compensated quantity of −20 ps/nm/nm for the wavelength path groups A, B.

The dispersion slope is compensated from 10 ps/nm/nm to 0 ps/nm/nm by setting the variable dispersion slope compensator in the path vi to the dispersion slope compensated quantity of −10 ps/nm/nm for the wavelength path group C. The dispersion slope of the wavelength path group E are compensated from −20 ps/nm/nm to 0 ps/nm/nm and the dispersion slope of the wavelength path group F are compensated from −30 ps/nm/nm to 0 ps/nm/nm by each setting the variable dispersion slope compensators in the paths vii and x at the dispersion slope compensated quantity of −10 and 30 ps/nm/nm for the wavelength path groups E, F.

Next, the monitor configuration for controlling the dispersion slope compensator and the monitoring method are described below.

Figure 9:
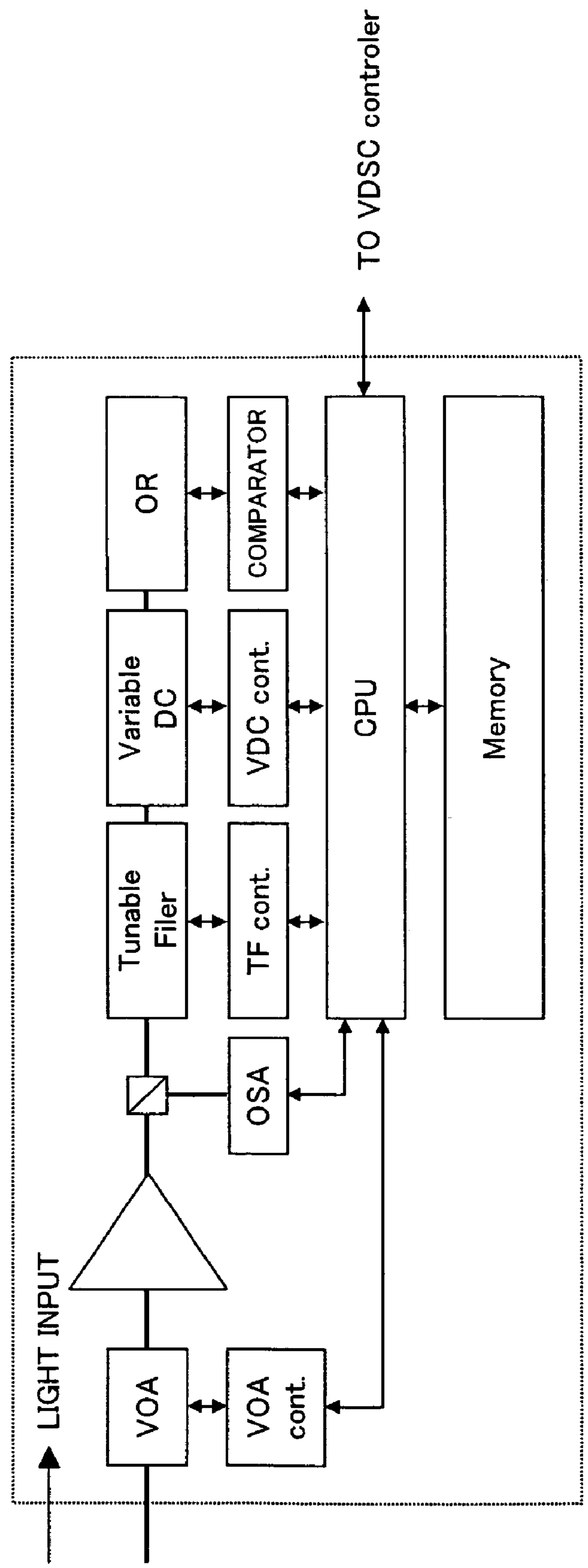
FIG. 9 is a diagram showing a configuration example of the chromatic dispersion monitor.

FIG. 9 is a diagram showing a configuration example of the chromatic dispersion monitor.

The chromatic dispersion monitor shown in the same Figure comprises the variable optical attenuator (VOA), the optical amplifier (OA), the optical spectrum analyzer (OSA), the turnable filter (TF), the variable dispersion compensator (VDC), the optical receiver (OR) and their controller, the central processing unit (CPU), the comparator, and the memory.

The optical power of the WDM signal input to the chromatic dispersion monitor is adjusted by VOA. This allows the optical receiving signal vs. noise ratio (OSNR) to be set at a desired value by adjusting the optical power input to OA. The output from OA is input to TF, and one arbitrary wavelength is selected from the WDM signal. After the chromatic dispersion of the wavelength is adjusted by VDC, a digital error rate (BER) received by OR, the number of the corrected errors, or the Q value corresponding to BER is measured. The comparator is a section that compares the data stored in the memory with the measured data. Furthermore, the dispersion compensated quantity of VDC and the measured results such as BER and the Q value are stored in the memory.

Next, described below are the concrete measurement procedures of the chromatic dispersion characteristics using the chromatic dispersion monitor shown above.

First, the wavelength to be measured is determined. Here, λi is selected as the wavelength to be measured. In the chromatic dispersion monitor shown in FIG. 9, the turnable filter is set so as to select λi which is the wavelength to be measured.

Next, the Q value "Q1" for the wavelength λi is measured with the chromatic dispersion compensated quantity of VDC as 0, and the chromatic dispersion compensated quantity of VDC and the Q value at the time of the measurement are stored in the memory. The Q value here is converted into a Q value corresponding to BER. The measurement of BER is performed using methods such as that which uses B1, B2 byte which is one of the section over-head (SOH) information of synchronous optical network (SONET)/synchronous digital hierarchy (SDH) and another which uses the number of the corrected errors of optical transport network (OTN), digital wrapper (DW), or forward error correction (FEC).

Next, the Q value "Qi" is measured while gradually varying the chromatic dispersion compensated quantity of VDC, and the wavelength compensated quantities of each VDC and the Q values "Qi" at the time of the measurement are stored in the memory. Then, the chromatic dispersion compensated quantity of VDC at the highest Q value is set as the optimum dispersion compensated quantity for the measured wavelength.

Figure 10:
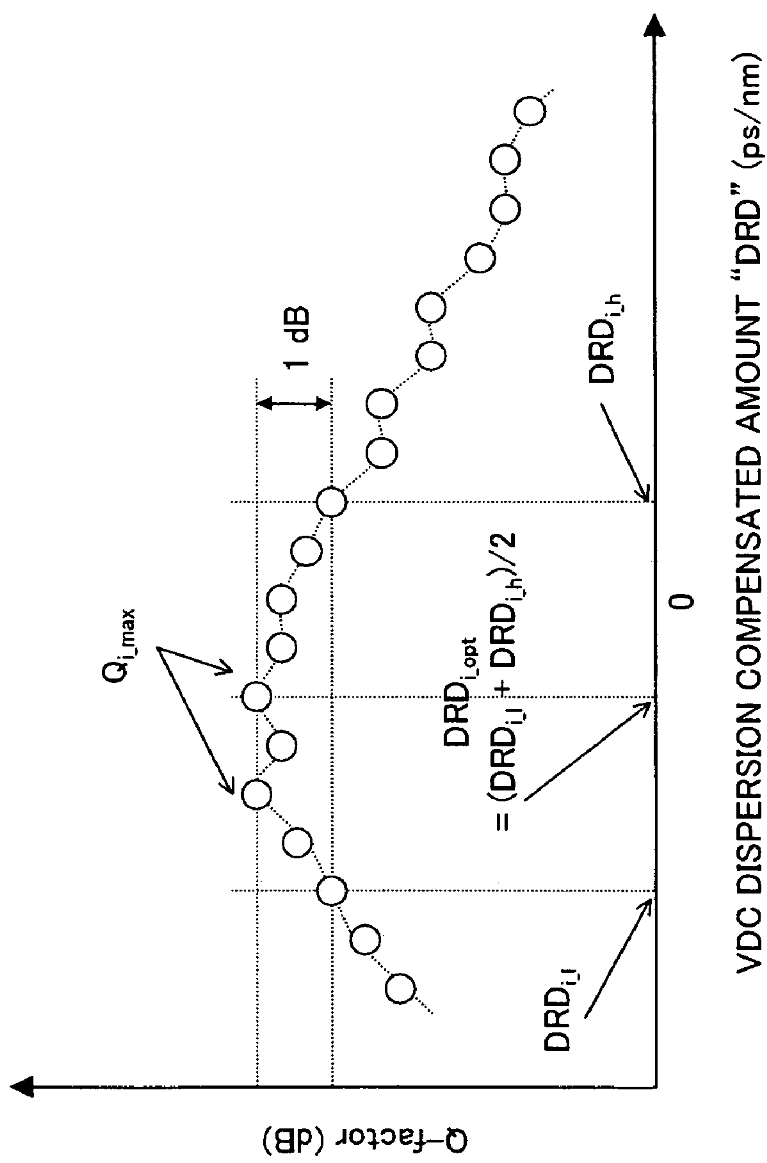
FIG. 10 is a diagram showing the relation between the dispersion compensated quantity "DRD" of VDC and Q value.

The relation between the dispersion compensated quantities "DRD" of VDC, measured as described above, and the Q value is shown in FIG. 10. The vertical axis in FIG. 10 shows the Q value (Q-factor in the Figure) and the horizontal axis shows the dispersion compensated quantity of VDC (VDC dispersion compensated quantity "DRD" in the Figure).

Normally, the relation between the Q value and the chromatic dispersion varies significantly, as shown in the Figure. This factor for this variation is the influence of the waveform distortion which is due to the interaction of the nonlinear effect and the chromatic dispersion of an optical fiber. As shown in the same Figure, the dispersion compensated quantity of VDC at the highest Q value (DRDi_opt) is not necessarily determined singly. Therefore, for example, as shown in FIG. 10, the dispersion compensated quantity of VDC of the Q value lower by 1 db than the highest Q value "Qi_max" is read (DRDi_1 and DRDi_h in the Figure), and the central value (DRDi_1+DRDi_)/2 is DRDi_opt.

The measurement above is made on a plurality of wavelengths. The results are shown in FIG. 1.

Figure 11:
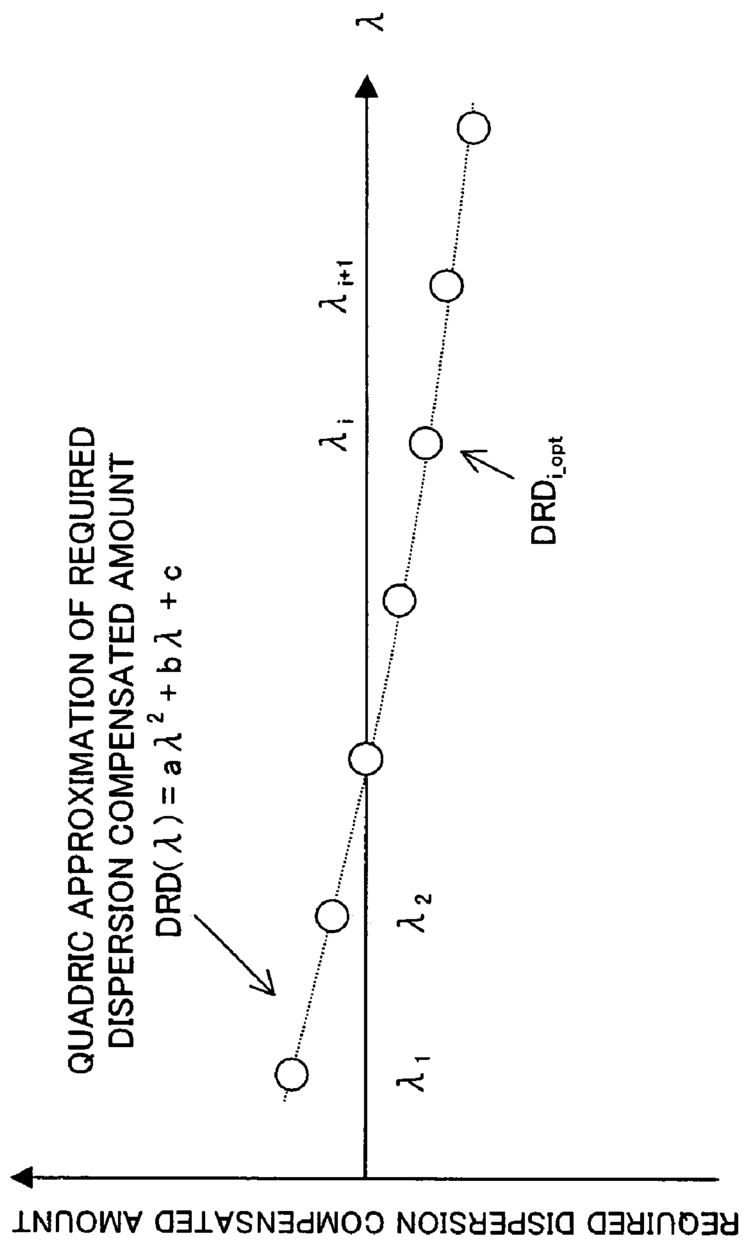
FIG. 11 is a diagram showing a desired dispersion compensated quantity vs. signal optical wavelength characteristics.

FIG. 11 shows the desired dispersion compensated quantity characteristics vs. signal optical wavelength characteristics. The vertical axis shows the desired dispersion compensated quantity and the horizontal axis the signal optical wavelength. The dispersion compensated quantities of each wavelength obtained by the foregoing measurement above are indicated by ○ and the results of approximation of function up to a maximum of 2-degree (DRD ($\lambda$)=$\alpha\lambda^2$+b$\lambda$+c) performed on these measured results are indicated by the dotted lines. Here, if the dispersion slope compensated quantity (ps/nm/nm) at the central wavelength $\lambda_c$ in the transmission band of the photonic network is determined, this is expressed by Equation 15 as follows:

$$\frac{d}{d\lambda}DRD(\lambda)\Big|_{\lambda=\lambda_c} = 2a\lambda_c + b \quad \text{Equation 15}$$

In this case, if the characteristics (VDSC ($\lambda$)) of the dispersion slope compensator is determined so as to allow the wavelength in the central wavelength $\lambda_c$ to be 0 ps/nm, this is expressed by Equation 16 as follows:

$$VDSC(\lambda)=(2a\lambda_c+b)\lambda-2a\lambda_c^2-b\lambda_c \quad \text{Equation 16}$$

In addition, the chromatic dispersion compensated quantity (ps/nm) in the central wavelength is expressed by the following equation 17:

$$DRD(\lambda_c)=a\lambda_c^2+b\lambda_c+c \quad \text{Equation 17}$$

Figure 12:
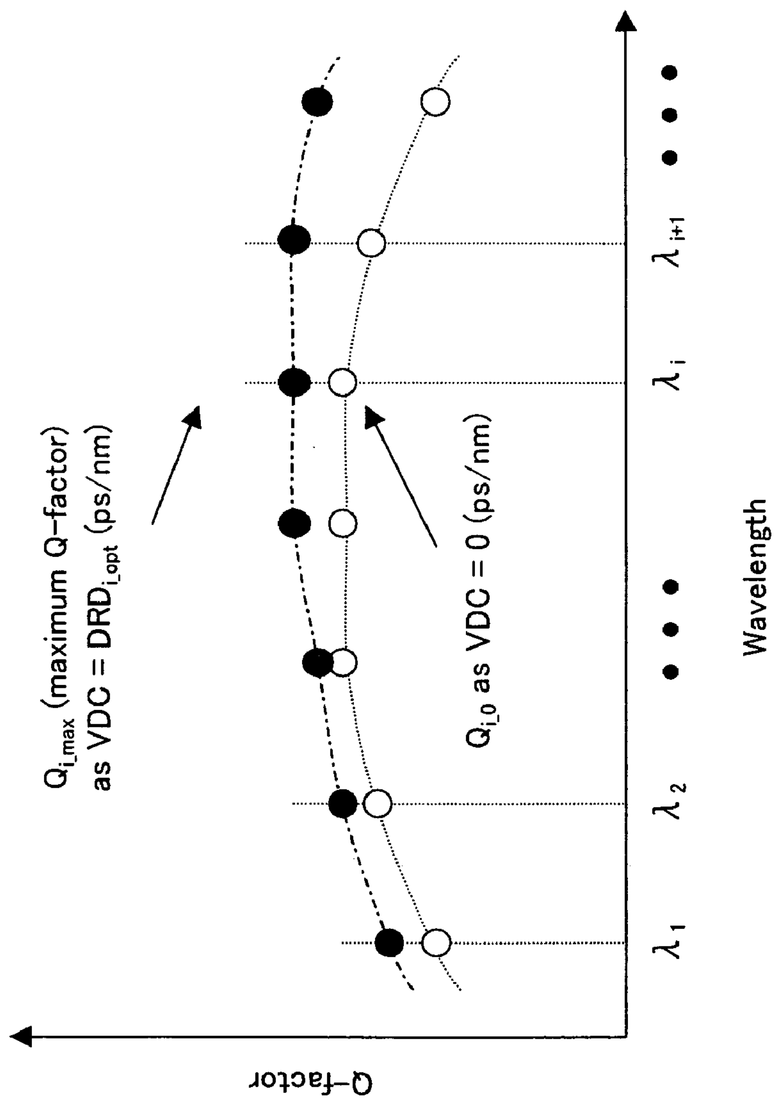
FIG. 12 is a diagram showing a Q value vs. signal optical wavelength characteristics when the chromatic dispersion compensation and the dispersion slope compensation are performed.

The Q value vs. signal optical wavelength characteristics when the chromatic dispersion compensation and the dispersion slope compensation are performed is shown in FIG. 12.

The vertical axis in FIG. 12 indicates the Q value (A-factor in the Figure) and the horizontal axis indicates the signal optical wavelength (wavelength in the Figure). The ○ in the Figure indicates the Q value characteristics when the dispersion compensation is 0 (ps/nm), and the ● in the Figure indicates the Q value characteristics when the dispersion compensation shown in FIG. 11 is performed.

Next, explained below is the flow of the entire processing of the afore-mentioned embodiments by using a flowchart.

FIG. 13 is the flowchart showing the flow of the entire processing.

First, in step S1301, the wavelength path route is set by the operator; in step S1302, the wavelength path route information is stored in NMS; and in step S1303, the setting command of the wavelength path is transmitted to each node from. NMS.

Next, in step 1304, the optical signal is transmitted from the optical transmitting end, the wavelength selective switch is controlled so as to allow the optical signal to be connected with a desired optical path at the HUB node, and the optical signal is connected with the optical receiving end.

In step S1305, the accumulated chromatic dispersion characteristics of all the wavelengths in operation are measured by using the chromatic dispersion monitor disposed at the input sections of each optical receiving end, and the results are transferred to NMS.

Furthermore, in step S1306, the wavelength path groups are set for each signal optical wavelength which passing through the same path from the optical remitting end to the optical receiving end using the wavelength path route information in NMS.

In step S1307, approximation of function is performed on the accumulated chromatic dispersion characteristics by each wavelength path group for the accumulated chromatic dispersion characteristics measured in step S1305 in NMS.

Furthermore, in step S1308, the paths in which the chromatic dispersion compensation is controlled by using the afore-mentioned equations 7 to 10 in NMS are determined. In this case, if the number of wavelength path groups is N, N paths are selected with regard to paths on which the chromatic dispersion compensation control is performed.

In step S1309, the chromatic dispersion compensated quantity for each path is determined by using the afore-mentioned equation 11 in NMS.

In step S1310, the variable chromatic dispersion compensator contained in the path in which the chromatic dispersion compensation is performed is controlled from NMS so as to obtain the chromatic dispersion compensated quantity determined in step S1309.

In step S1311, the accumulated chromatic characteristics of all wavelengths in operation are measured by using the chromatic dispersion monitor disposed at the input sections of each optical receiving end, and the results are transferred to NMS.

Furthermore, in step S1312, whether or not the accumulated chromatic dispersion values of all the wavelengths are desired values is judged in NMS based on the measurements in Step S1311, and if desired accumulated chromatic dispersion values are not obtained, the processing is returned to the step 1307.

As described above, the embodiments according to the present invention are explained with reference to the drawings. However, the information processor to which the present invention is applied is not limited to the afore-mentioned embodiments if the function is executed, and it is needless to say that the device according to the present invention may be a single device, a system comprising a plurality of devices or an integrated device, or a system where processing is executed through network such as LAN and WAN.

Figure 14:
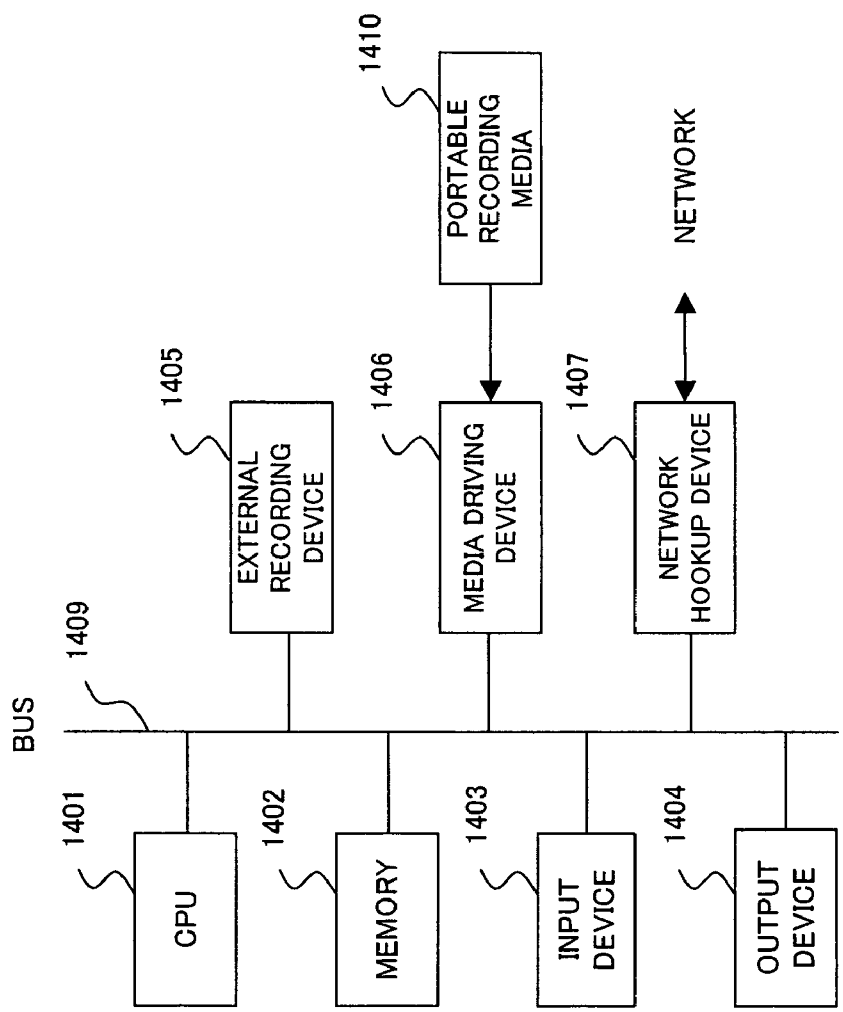
FIG. 14 is a configuration diagram of the information processors in the present invention.

In addition, as shown in FIG. 14, the system according to the invention can be realized even by a system comprising the CPU 1401, the memory 1402 of ROM or RAM, the input device 1403, the output device 1404, the external recording device 1405, the media driving device 1406, the portable recording media 1410, the network connecting device 1407 which are connected with path 1409. In other words, it is needless to say that the present invention can also be realized if the memory 1402 of ROM or RAM, the external recording device 1405 or the portable recording media 1410 to which the program codes of the software which realizes the system in the afore-mentioned embodiments are recorded are supplied to the information processing device, and the program code is read and executed by the computer of the information processing device.

In this case, the program code per se which is read from the portable recording media 1410 or the like can realize the new function according to the present invention, the portable recording media 1410 or the like which record the program codes constitute the present invention.

As the portable recording media 1410 for supplying the program codes, for example, a flexible disk, a hard disk, an optical disk, a magneto-optic disk, CD-ROM, CD-R, DVD-ROM, DVD-RAM, a magnetic tape, a non-volatile memory card, a ROM card, and various recording media or the like recorded through network connecting devices 1407 (in other words, telecommunication lines) such as electronic mail and personal computer communications can be used.

Figure 15:
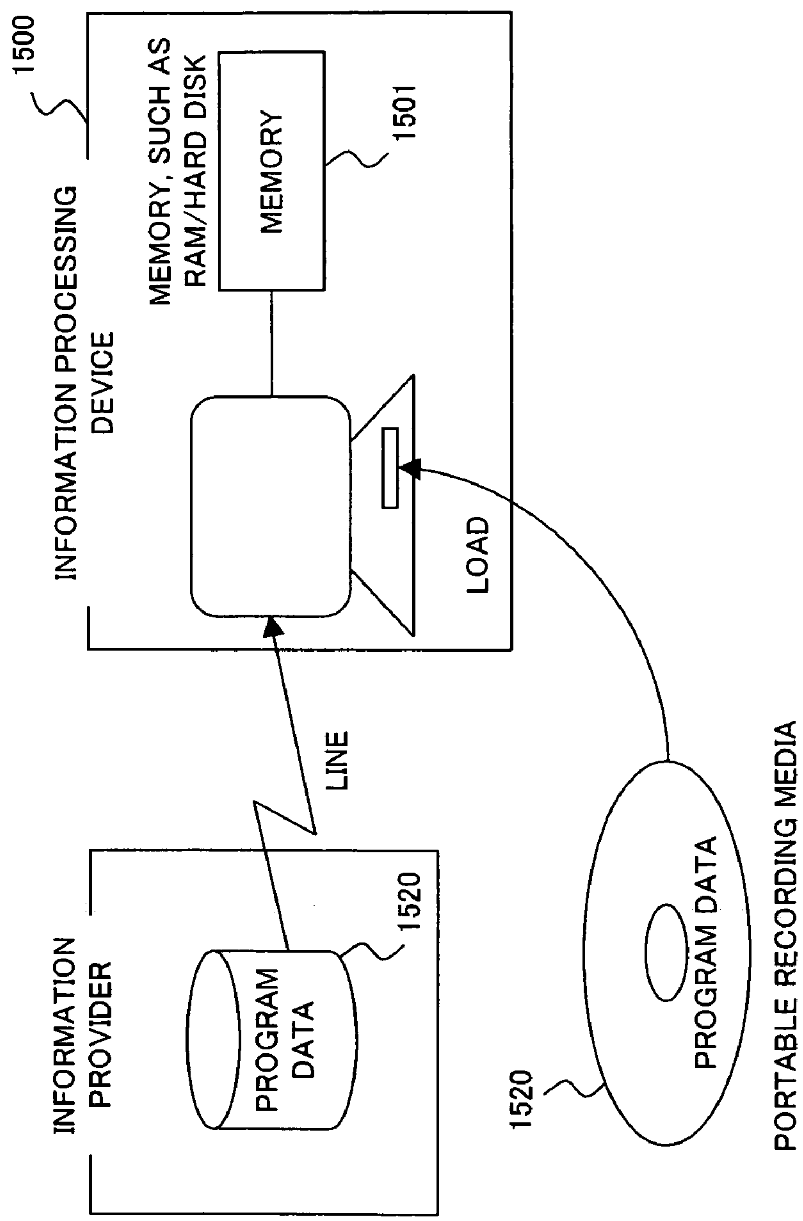
FIG. 15 is a diagram describing loading of the control program to the computers in the present invention.

In addition, as shown in FIG. 15, aside from realizing the function of the afore-mentioned embodiment by allowing the computer (the information processing device) 1500 to execute the program codes read the memory 1501, the afore-mentioned function of an embodiment is realized when the OS or the like operating on the computer 1500 performs a part or all the actual processing, based on the command of the program code.

Furthermore, after the program codes read from the portable recording media 1510 and the program (data) supplied from the program (data) providers are written in the memory 1501 provided in the function extension board inserted into the computer and the function extension unit connected with the computer 1500, the CPUs or the like provided at the function extension board and the function extension unit perform a part or all of the actual processing in accordance with the instruction of the programs, and the aforementioned function of the embodiments can be realized by this processing.

In other words, the present invention is not limited to the afore-mentioned embodiments, and various configurations or forms can be taken in a scope that does not deviate from the gist of the present invention.

According to the present invention, the chromatic dispersion compensation control can be realized without depending on the path of the signal optical wavelength by the network configuration information, the path information of the signal optical wavelength stored in the network management system and the chromatic dispersion monitor at the optical receiving end.

What is claimed is:

1. A wavelength division multiplexing optical transmission system provided with an optical transmitting end device, an optical amplification repeater, an optical switching device which performs an optical branched insertion or an optical path shifting of an optical signal as is, and an optical receiving end device are connected with an optical fiber, and which has a network management system which integrally manages the optical transmitting end device, the optical amplification repeater, the optical switching device and the optical receiving end device;

wherein the optical transmitting end device is provided with the chromatic dispersion monitor at its input stage;

at least one optical amplification repeater disposed between the optical transmitting end device and the optical switching device, between the optical switching devices, between the optical switching device and the optical receiving end device, or the optical transmitting end device and the optical receiving end device, the optical switching device or the optical receiving end device is provided with a variable chromatic dispersion compensator;

said network management system is a wavelength division multiplexing optical transmission system which is provided with a memory which stores configuration information of the network including the path information of the signal optical wavelength, layout information and connection information of each device configuring the wavelength division multiplexing optical transmission; and a unit for computing the chromatic dispersion compensated quantity and position of the variable chromatic dispersion compensator with which the optical amplification repeater, the optical switching device or the optical receiving end device is provided based on the measured results of the accumulated chromatic dispersions of each signal optical wavelength by the chromatic dispersion monitor and the path information of the signal optical wavelength;

a chromatic dispersion compensated quantity controller which sets the chromatic dispersion according to said computed chromatic dispersion compensated quantity to the variable chromatic dispersion compensator is provided.

2. The wavelength division multiplexing optical transmission system according to claim 1, wherein a plurality of signal optical wavelengths of one wavelength or more which passes through the same path from said optical transmitting end device to said optical receiving end device are determined to be one signal optical wavelength group, and a matrix wherein the row indicates the signal optical wavelength group i and the column indicates a path j is created using the path information of the signal optical wavelength held by the network management system;

the factor of the matrix, $p_{ij}$, is determined to be $p_{ij}=1$ if the signal optical group i passes through a certain path j, or $p_{ij}=0$ if it does not pass through the path;

in said matrix, the number of paths ($LC_i$) through which each signal optical wavelength group i passes is determined by:

$$LC_i = \sum_j p_{ij}$$

the number of signal optical wavelengths ($PC_j$) which are placed in each path j is determined by:

$$PC_j = \sum_i p_{ij}$$

the dot product ($IC_j$) of the column $p_{ij}$ (j being a constant) of said matrix and said $LC_i$ is determined by:

$$IC_j = \sum_i p_{ij} \cdot LC_i$$

the chromatic dispersion compensation control is performed from a path where both $PC_j$ and $IC_j$ are small, in the wavelength division multiplexing optical transmission system according to claim 1.

3. The wavelength division multiplexing optical transmission system according to claim 2, wherein a plurality of signal optical wavelengths of one wavelength or more which pass through the same path from said optical transmitting end device to said optical receiving end device is determined to be one signal optical wavelength group;

having a function for storing the measured results of the chromatic dispersion of the optical fiber measured when the optical fiber is laid or when the devices are installed in the network management system;

having a unit for finding the accumulated chromatic dispersion values of each signal optical wavelength from the measured results of the chromatic dispersion of said optical fiber and the path information of the signal optical wavelengths stored by the network management system;

having a function for storing the measured results of the accumulated chromatic dispersion of said each signal wavelength group in the network management system;

performing approximation of function for each measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength λ from said approximating equation;

computing a chromatic dispersion slope value in the arbitrary wavelength λ by an equation where single differential is performed on said approximation equation of function;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 2.

4. The wavelength division multiplexing optical transmission system according to claim 2, wherein a plurality of signal optical wavelengths of one wavelength or more which passes through the same oath from said optical transmitting end device to said optical receiving end device is determined to be one signal optical wavelength group;

having a function for storing the measured results of the accumulated chromatic dispersion of each signal optical length by said chromatic dispersion monitor in the network management system;

performing approximation of function for each measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength λ from said approximating equation;

computing a chromatic dispersion slope value in the arbitrary wavelength λ by an equation where single differential is performed on said approximating equation;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 2.

5. The wavelength division multiplexing optical transmission system according to claim 1, wherein a plurality of signal optical wavelengths of one wavelength or more which passes through the same path from said optical transmitting end device to said optical receiving end device are determined to be one signal optical wavelength group, and a matrix where the row indicates the signal optical wavelength group i and the column indicates the path j is created using the path information of the signal optical wavelength kept by the network management system;

the factor of the matrix, $p_{ij}$, is determined to be $p_{ij}=1$ if the signal optical group i passes through a certain path j, or $p_{ij}=0$ if it does not pass through the path;

in said matrix, the number of paths ($LC_i$) through which each signal optical wavelength group i passes is determined by:

$$LC_i = \sum_j p_{ij}$$

the number of signal optical wavelengths ($PC_j$) which are accommodated in each path j is determined by:

$$PC_j = \sum_i p_{ij}$$

the dot product ($IC_j$) of the column $p_{ij}$ (j being a constant) of said matrix and said $LC_i$ is determined by:

$$IC_j = \sum_i p_{ij} \cdot LC_i$$

the chromatic dispersion compensation control is performed from the path where both $PC_j$ and $IC_j$ are large, in the wavelength division multiplexing optical transmission system according to claim 1.

6. The wavelength division multiplexing optical transmission system according to claim 5, wherein a plurality of signal optical wavelengths of one wavelength or more which passes through the same path from said optical transmitting end device to said optical receiving end device is determined to be one signal optical wavelength group;

having a function for storing the measured results of the chromatic dispersion of the optical fiber measured when the optical fiber is laid or when the devices are installed in the network management system;

having a unit for finding the accumulated chromatic dispersion values of each signal optical wavelength using the measured results of the chromatic dispersion of said optical fiber and the path information of the signal optical wavelengths stored by the network management system;

having a function for storing the measured results of the accumulated chromatic dispersion of said each signal wavelength group in the network management system;

performing approximation of function for each measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength λ from said approximating equation;

computing a chromatic dispersion slope value in the arbitrary wavelength λ by an equation where single differential is performed on said approximating equation;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 5.

7. The wavelength division multiplexing optical transmission system according to claim 5, wherein a plurality of signal optical wavelengths of one wavelength or more which passes through the same path from said optical transmitting end device to said optical receiving end device is determined to be one signal optical wavelength group;

having a function for storing the measured results of the accumulated chromatic dispersion of each signal optical wavelength by said chromatic dispersion monitor in the network management system;

performing approximation of function for each measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength λ from said approximating equation;

computing a chromatic dispersion slope value in the arbitrary wavelength λ by an equation where single differential is performed on said approximating equation;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 5.

8. The wavelength division multiplexing optical transmission system according to claim 1, wherein a plurality of signal optical wavelengths of one wavelength or more which passes through the same path from said optical transmitting end device to said optical receiving end device is determined to be one signal optical wavelength group;

having a function for storing the measured results of the accumulated chromatic dispersion of each signal optical wavelength by said chromatic dispersion monitor to the network management system;

performing approximation of function using measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength λ from said approximating equation;

computing a chromatic dispersion slope value in the arbitrary wavelength λ by using an equation where primary differential is performed on the approximating equation;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 1.

9. The wavelength division multiplexing optical transmission system according to claim 1, wherein a plurality of signal optical wavelengths of one wavelength or more which passes through the same path from said optical transmitting end device to said optical receiving end device is determined to be one signal optical wavelength group;

selecting upper N paths from the result which determine the order of the paths on which the chromatic dispersion compensation control is performed by claim 2 or claim 5 if there are N number of signal optical wavelength groups, and determining the dispersion slope quantity of the wavelength group i to be $DS_i$;

and determining the dispersion slope compensated quantity $DSC_j$ in each path j by finding N-degree primary simultaneous equations which is:

$$\begin{bmatrix} p_{11} & p_{12} & \cdots & p_{1j} & \cdots & p_{1N} \\ p_{21} & p_{22} & \cdots & p_{2j} & \cdots & p_{2N} \\ \vdots & \vdots & & \vdots & & \vdots \\ p_{i1} & p_{i2} & \cdots & p_{ij} & \cdots & p_{iN} \\ \vdots & \vdots & & \vdots & & \vdots \\ p_{N1} & p_{N2} & \cdots & p_{Nj} & \cdots & p_{NN} \end{bmatrix} \cdot \begin{bmatrix} DSC_1 \\ DSC_2 \\ \vdots \\ DSC_j \\ \vdots \\ DSC_N \end{bmatrix} = - \begin{bmatrix} DS_1 \\ DS_2 \\ \vdots \\ DS_3 \\ \vdots \\ DS_4 \end{bmatrix}$$

if the dispersion slope compensated quantity to said selected path j is determined to be $DSC_j$, in the wavelength division multiplexing optical transmission system according to claim 1.

10. The wavelength division multiplexing optical transmission system according to claim 1, wherein a plurality of signal optical wavelengths of one wavelength or more which passes through the same path from said optical transmitting end device to said optical receiving end device is determined to be one signal optical wavelength group;

having a function for storing the measured results of the chromatic dispersion of the optical fiber measured when the optical fiber is laid or when the devices are installed in the network management system;

having a unit for finding the accumulated chromatic dispersion values of each signal optical wavelength from the measured results of the chromatic dispersion of said optical fiber and the path information of the signal optical wavelengths stored by the network management system;

having a function for storing the measured results of the accumulated chromatic dispersion of said each signal wavelength group in the network management system;

performing approximation of function for each measured result of the accumulated chromatic dispersion of the signal optical wavelength which belongs to said signal optical wavelength group by using n-degree polynomial equation, 3-degree Sellmeier's polynomial equation, or 5-degree Sellmeier's polynomial equation;

computing a accumulated chromatic dispersion value in an arbitrary wavelength $\lambda$ from said approximating equation;

computing a chromatic dispersion slope value in the arbitrary wavelength $\lambda$ using an equation where single differential is performed on said approximating equation;

determining the chromatic dispersion slope compensated quantity from a difference between said accumulated chromatic dispersion value and a desired accumulated chromatic dispersion value;

determining the chromatic dispersion slope compensated quantity from a difference between said chromatic dispersion slope value and a desired chromatic dispersion slope value;

setting the dispersion value of a chromatic dispersion compensated quantity controller with which said optical amplification repeater, said optical switching device, or said optical receiving end device is provided so as to obtain said chromatic dispersion compensated quantity and said chromatic dispersion slope compensated quantity, and providing the chromatic dispersion compensated quantity controller which performs the chromatic dispersion compensation, in the wavelength division multiplexing optical transmission system according to claim 1.

11. A wavelength division multiplexing optical transmission system where an optical transmitting end device, an optical amplification repeater, an optical switching device which performs an optical branched insertion or an optical path shifting of an optical signal as is, and an optical receiving end device are connected with an optical fiber, and which has a network management system which integrally manages said optical transmitting end device, said optical amplification repeater, said optical switching device and said optical receiving end device;

wherein said optical transmitting end device is provided with the chromatic dispersion monitor at its input stage;

at least one optical amplification repeater disposed between the optical transmitting end device and the optical switching device, between the optical switching devices, between the optical switching device and the optical receiving end device, or the optical transmitting end device and the optical receiving end device, the optical switching device or the optical receiving end device is provided with a variable chromatic dispersion compensator;

said network management system is provided with a memory which stores configuration information of the network comprising layout information and connection information of each device configuring said wavelength division multiplexing optical transmission system and the path information of the signal optical wavelength;

means for computing the position and chromatic dispersion compensated quantity of the variable chromatic dispersion compensator with which said optical amplification repeater, said optical switching device or said optical receiving end device are provided based on the measured results of the accumulated chromatic dispersions of each signal optical wavelength by said chromatic dispersion monitor and the path information of said signal optical wavelength;

a chromatic dispersion compensated quantity controller which sets the chromatic dispersion according to said computed chromatic dispersion compensated quantity at the variable chromatic dispersion compensator is provided.

* * * * *

CERTIFICATE OF CORRECTION

PATENT NO. : 7,146,066 B2
APPLICATION NO. : 10/995179
DATED : December 5, 2006
INVENTOR(S) : Toru Katagiri et al.

It is certified that error appears in the above-identified patent and that said Letters Patent is hereby corrected as shown below:

On Title Page, Item (56) (Other Publications), Line 3, change “Letters” to --Letters,--.

Column 19, Line 55, change “oath” to --path--.

Signed and Sealed this

Twenty-seventh Day of March, 2007

JON W. DUDAS

*Director of the United States Patent and Trademark Office*